US009940307B2

(12) United States Patent
Demiralp et al.

(10) Patent No.: US 9,940,307 B2
(45) Date of Patent: Apr. 10, 2018

(54) AUGMENTING TEXT WITH MULTIMEDIA ASSETS

(71) Applicant: Adobe Systems Incorporated, San Jose, CA (US)

(72) Inventors: Emre Demiralp, San Jose, CA (US); Gavin Stuart Peter Miller, Los Altos, CA (US); Walter W. Chang, San Jose, CA (US); Daicho Ito, San Jose, CA (US); Grayson Squier Lang, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 784 days.

(21) Appl. No.: 13/731,445

(22) Filed: Dec. 31, 2012

(65) Prior Publication Data

US 2014/0189501 A1    Jul. 3, 2014

(51) Int. Cl.
*G06F 17/30* (2006.01)
*G06F 17/22* (2006.01)
*G06F 17/27* (2006.01)

(52) U.S. Cl.
CPC ...... *G06F 17/2235* (2013.01); *G06F 17/2765* (2013.01); *G06F 17/30* (2013.01)

(58) Field of Classification Search
CPC ....................................................... G06F 17/30
USPC ....................................................... 715/243
See application file for complete search history.

(56) References Cited

U.S. PATENT DOCUMENTS

| | | | | |
|---|---|---|---|---|
| 8,447,110 | B2 * | 5/2013 | Inagaki | 382/177 |
| 2006/0247914 | A1 * | 11/2006 | Brener | G06F 17/274 704/1 |
| 2007/0067285 | A1 * | 3/2007 | Blume | G06Q 10/10 |
| 2008/0275694 | A1 * | 11/2008 | Varone | G06F 17/2785 704/9 |
| 2009/0144609 | A1 * | 6/2009 | Liang | G06F 17/21 715/230 |
| 2010/0064007 | A1 * | 3/2010 | Randall | 709/204 |
| 2010/0088376 | A1 * | 4/2010 | Kunz et al. | 709/205 |
| 2013/0073932 | A1 * | 3/2013 | Migos | G06F 15/0291 715/201 |
| 2013/0145241 | A1 * | 6/2013 | Salama | 715/202 |
| 2013/0151538 | A1 * | 6/2013 | Dmitriev | G06F 17/30616 707/750 |
| 2013/0238727 | A1 * | 9/2013 | Martinez | H04L 67/306 709/206 |

(Continued)

*Primary Examiner* — Kavita Padmanabhan
*Assistant Examiner* — Tionna Burke
(74) *Attorney, Agent, or Firm* — Kilpatrick Townsend & Stockton LLP

(57) ABSTRACT

Systems and methods are provided for providing a navigation interface to access or otherwise use electronic content items. In one embodiment, an augmentation application identifies at least one entity referenced in a document. The entity can be referenced in at least two portions of the document by at least two different words or phrases. The augmentation application associates the at least one entity with at least one multimedia asset. The augmentation application generates a layout including at least some content of the document referencing the at least one entity and the at least one multimedia asset associated with the at least one entity. The augmentation application renders the layout for display.

18 Claims, 9 Drawing Sheets

(56) References Cited

U.S. PATENT DOCUMENTS

2014/0038154 A1\* 2/2014 Brownlow .............. G09B 5/06
434/317

\* cited by examiner

US 9,940,307 B2

1

AUGMENTING TEXT WITH MULTIMEDIA ASSETS

TECHNICAL FIELD

This disclosure relates generally to computer-implemented methods and systems and more particularly relates to augmenting text with multimedia assets.

BACKGROUND

Electronic devices, such as tablet computers and other electronic reading devices, may be used to display textual content, such as an electronic book ("e-book"). A reader may be interested in adding multimedia content to accompany the text, such as illustrations or photographs.

Prior solutions for providing content associated with the text of a document can include several disadvantages. For example, solutions allowing the addition of multimedia content to text require a user to manually select multimedia content items and associate the multimedia content items with portions of the text. Other solutions for providing content associated with the text of a document are limited to a look-up function. For example, a cursor hovering over a word or phrase in a document may cause a link to a related web page to be displayed. Such solutions are limited to using the selected word or phrase as a search term in isolation from the context of the document in which the word or phrase is located.

SUMMARY

One embodiment involves identifying at least one entity referenced in a document. The entity is referenced in at least two portions of the document by at least two different words or phrases. The embodiment further involves associating the at least one entity with at least one multimedia asset. The embodiment further involves generating a layout including at least some content of the document referencing the at least one entity and the at least one multimedia asset associated with the at least one entity. The embodiment further involves rendering the layout for display.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
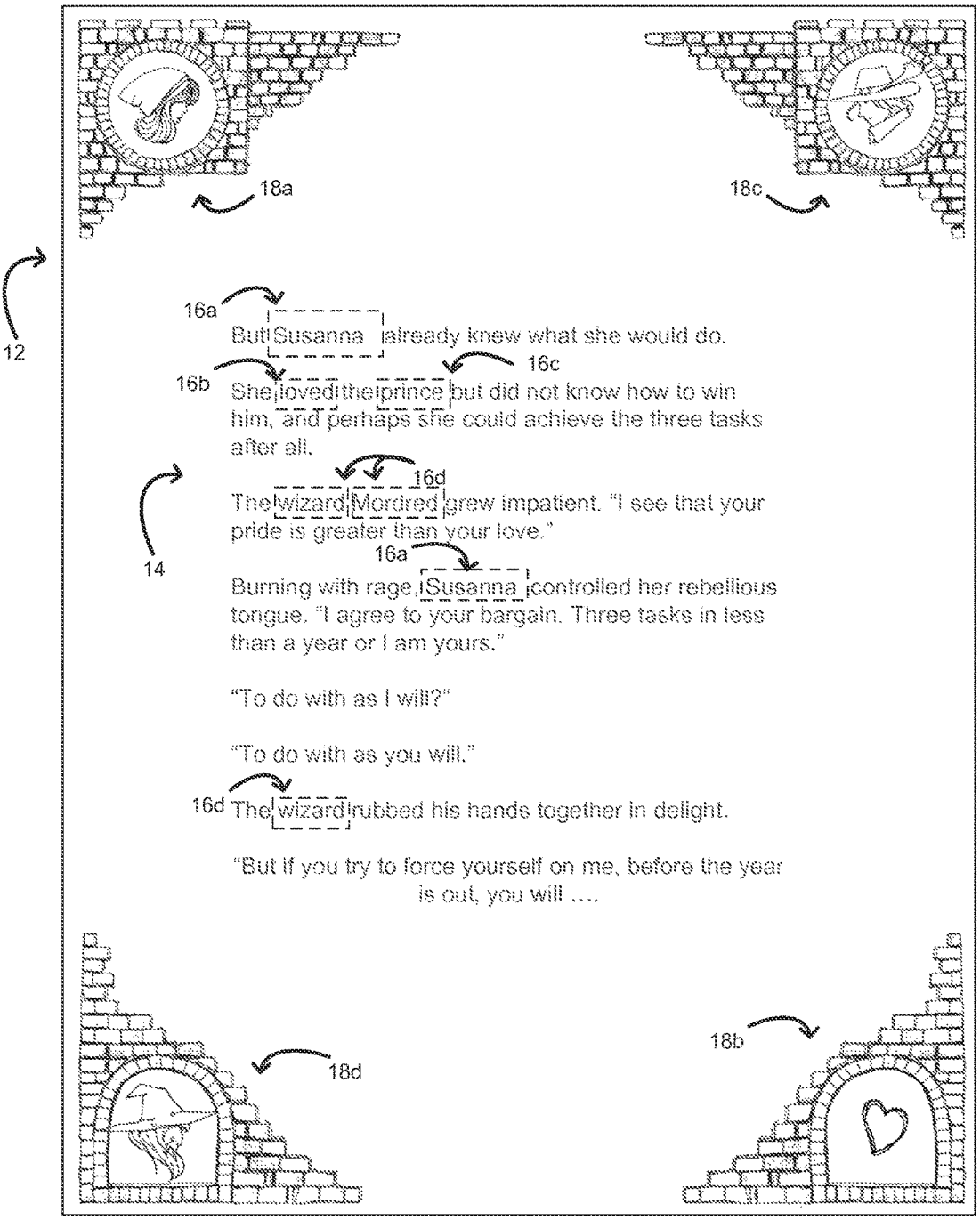
FIG. 1 is a modeling diagram illustrating an example of augmenting text content with multimedia assets.

Computer-implemented systems and methods are disclosed for augmenting text with multimedia assets. An augmentation application can organize, classify, and otherwise associate text with entities represented by multimedia assets to provide a sensory experience concurrently with reading text. For example, FIG. 1 depicts augmented text from an electronic book ("e-book") or another document, such as a page 12. The augmentation application analyzes the text 14 of the e-book to identify entities, such as characters (i.e., personas), objects, emotions, locations, etc. For example, as depicted in FIG. 1, the augmentation application can identify entities 16a-d. The entity 16a corresponds to the character "Susanna." The entity 16b corresponds to an emotion, such as "love." The entity 16c corresponds to the character "The prince." The entity 16c corresponds to the character "The wizard." The augmentation application automatically creates associations between a given entity and a multimedia asset representative of the entity. Examples of such multimedia assets include the images 18a-d depicted in FIG. 1. The augmentation application may analyze a novel, determine that a wizard entity 16d is mentioned throughout the novel, and create an association between the wizard entity 16d and an image 18d of a wizard. The wizard entity 16d can be referenced by multiple words or phrases, such as "the wizard" or "Mordred." The augmentation application can provide an interface, such as a page of an e-book, that simultaneously displays the multimedia assets with the text referencing the entities associated with the multimedia assets. For example, as depicted in FIG. 1, the augmentation application identifies the entities 16a-d referenced by the text 14 and displays the corresponding images 18a-d.

The augmentation application can thus augment the experience of reading text documents, such as e-books or e-mail, using multimedia assets representing entities described in the text. The augmentation application can be used with any method or device for accessing an electronic document, such as (but not limited to), an e-book, a web-site accessed via any computing device, a smart phone application, a tablet computer application, etc. Using multimedia assets to augment the experience of reading text documents such as e-books can enhance story ambience by providing visual representations of story elements, settings, characters, and artifacts. In one example, individual publishers may use an augmentation application to automatically generate compelling multimedia for e-books or books to be printed. In another example, a virtual community can create custom "skins" and/or frames enabling branded styles and messaging for e-books. Using multimedia assets to augment the experience of reading textual content such as (but not limited to) e-mail or websites can allow for targeted messaging and branding for the textual content.

In accordance with one embodiment, an augmentation application provides augmentation of a text document or other content when displayed by a viewer application such as an e-book application. The augmentation application identifies at least one entity referenced in a document. In some embodiments, the same entity may be referenced in at least two portions of the document by at least two different words or phrases. For example, an entity for "Susanna" may be referenced by words or phrases such as "Princess Susanna," "Susanna Smith," "Susanna's", "the silly princess," etc. The augmentation application can perform natural language processing to determine that each of the different words or phrases is a reference to the entity "Susanna." The augmentation application associates the at least one entity with at least one multimedia asset. Any portion of a document can be analyzed to identify entities and multimedia assets to be displayed. In some embodiments, the augmentation application can identify entities and multimedia assets based on analyzing one page at a time. In other embodiments, the augmentation application can identify entities and multimedia assets based on analyzing each chapter in a book to determine which multimedia assets are to be displayed. In other embodiments, the augmentation application can identify entities and multimedia assets based on analyzing an entire e-book. In some embodiments, a multimedia asset can be selected from stored multimedia assets. In other embodiments, the augmentation application can generate a new multimedia asset based on analyzing the content of the document. In one example, the augmentation application may generate a composite image from existing images, such as combining images of a fish or a boat with an image of a river. In another example, the augmentation application may generate a completely new image.

The augmentation application generates a layout including at least some content of the document referencing the at least one entity and the at least one multimedia asset associated with the at least one entity. A non-limiting example of a layout is a frame. A frame is a portion of a text document rendered for a display on a display device. Generating a layout can include positioning displayed text and multimedia assets associated with entities referenced by the text within a frame. The augmentation application renders the layout for display.

As used herein, the term "entity" is used to refer to a logical object or construct having a persistent identity in multiple portions of a document. Non-limiting examples of an entity include a person or character, a location, an emotional state, a sensory experience, etc. In one example, a "character" entity is a logical object or construct representing a character or persona referenced in a novel. The novel may include multiple words, phrases, or variations thereof to reference the character entity, such as "the wizard," "the wizard Mordred," "Mordred", "the wizard's", etc. The augmentation algorithm can recognize the different words, phrases, or variations thereof as references to the same character entity. In another example, a "love" entity is a logical object or construct representing an emotional state referenced in a novel. The novel may include multiple words, phrases, or variations thereof to reference the "love" entity, such as "loved," "kisses," "desire," "burning love," etc. The augmentation algorithm can recognize the different words, phrases, or variations thereof as references to the same "love" entity.

As used herein, the term "natural language processing" is used to refer to one or more suitable processes and procedures for automatically deriving entities or other data from natural language, such as (but not limited to) written or printed speech.

As used herein, the term "multimedia asset" is used to refer to any type of media that can be rendered for display or use at a computing system or other electronic device. A multimedia asset can include images, video, audio, text, or any combination thereof.

In additional or alternative embodiments, the augmentation application can identify entities with multimedia assets using a feature ontology. The feature ontology can be used to classify entities based on any suitable perceptual property associated with entity. A perceptual property can include an attribute of an entity corresponding to some form of sensory perception. In one example, the augmentation application can select an image of a table entity based a visual attribute of the table entity (i.e., a description of the table). In another example, the augmentation application can select an audio file of running water corresponding to an aural attribute of a river entity.

As used herein, the term "feature ontology" is used to refer to a data structure or other logical object for hierarchical classification or other suitable classification of entities identified by analyzing text of a document. The feature ontology can classify entities as tangible objects. For example, a feature ontology can classify an entity as an animal, an activity, a body of water, an article of clothing, a piece of furniture, and the like. The feature ontology can also classify entities as intangible objects or states. For example, a feature ontology can classify an entity as a type of emotion. The feature ontology allows entities to be classified by algorithms associating text of a document with multimedia assets.

Entities can be ranked based on one or more criteria. For example, the augmentation application may include a statistical n-gram table listing each of the entities referenced in a document. The n-gram table can rank each entity based on the frequency with which the entity is referenced in the document.

As used herein, the term "n-gram" is used to refer to a contiguous sequence of n items from a given sequence of text or speech. An n-gram could be any combination of letters, words, numbers, etc. An n-gram can include unigrams having a single word, bigrams having two words, etc.

The augmentation application can select multimedia assets representing entities for inclusion in a frame based on rankings for the entity. The augmentation application can select a multimedia asset based on an associated entity being referenced frequently in the document (such as, but not limited to, being referenced on every page of the document) or the associated entity being referenced rarely in the document (such as, but not limited to, being referenced on only a few pages or only once in the document). For example, a novel may reference entities corresponding to a main character and an occasionally appearing character. The main character may be ranked higher than the occasionally appearing character based on the frequency with which each character is referenced in the novel. If a portion of text references both the main character and the occasionally appearing character in a novel, the augmentation application may select the occasionally appearing character for inclusion in a frame displaying the text for the purpose of highlighting the important of the occasionally appearing character in that portion of text.

In additional or alternative embodiments, the augmentation application can associate entities with multimedia assets using a mapping ontology.

As used herein, the term "mapping ontology" is used to refer to a data structure or other logical object for mapping entities identified by analyzing text of a document to multimedia assets representative of the entities.

In additional or alternative embodiments, associating entities with assets can modify metadata of multimedia assets to identify associated entities.

As used herein, the term "metadata" is used to refer to information associated with (and generally but not necessarily stored with) an electronic content item that describes a feature of the electronic content item. Metadata may describe a location or identification of electronic content. Non-limiting examples of metadata for an electronic content item can include a title, author, keywords, and the like. Metadata may also describe a relationship between a first electronic content item and a second electronic content item, such as how the first and second electronic content items can be combined and sequenced for a multimedia presentation. Metadata can also describe when and how an electronic content item was created, a file type and other technical information for the electronic content item, and/or access rights for the electronic content item. In some embodiments, metadata includes data included in the electronic content item that is not displayed by a client application using the electronic content item.

In additional or alternative embodiments, the augmentation application can generate a navigation interface for organizing a document based on entities associated with multimedia assets. The navigation interface can be used to navigate to portions of a document referencing various entities referenced in the document. For example, a fantasy novel may include entities such as wizards, dragons, and witches. The augmentation application can provide an interface providing visual representations of a wizard, a dragon, and a witch. Each visual representation of an entity can be associated with portions of a document, such as pages or chapters of a book, in which the entity is referenced. The interface can receive input selecting a visual representation of an entity and navigating to a portion of the document in which the entity is reference.

In additional or alternative embodiments, multimedia assets and/or associations between entities and multimedia assets can be provided by a virtual community of clients. A virtual community may be accessed via the server 120 and the network 106. For example, different clients in a virtual community can provide multimedia assets for use in the virtual community. Clients in a virtual community can additionally or alternatively provide suggested associations between multimedia assets and entities. An augmentation application 114 can access the virtual community to obtain multimedia assets to be associated with entities. For example, an online community including fans of a particular novel may allow different clients in the community to provide multimedia assets for association with different characters or settings in the book. An e-book application used for reading the novel can access the virtual community to obtain multimedia assets.

In additional or alternative embodiments, the augmentation application can perform analytics on text content using a feature ontology. The augmentation application can recommend words or changes to a writing style to the author based on text analytics. For example, the augmentation application can determine the frequency with which entities corresponding to perceptual properties, such as descriptions of colors, are referenced in a document. The augmentation application can thereby allow an author of textual content to analyze the author's writing style.

As used herein, the term "analytics" is used to refer to a description of statistics, patterns, or other characteristics of a document.

In additional or alternative embodiments, the augmentation application can analyze documents such as e-mail. For example, the augmentation application can identify entities in an e-mail as well as a layout (or "skin") customized to a given sender. In additional or alternative embodiments, the augmentation application can allow advertisers to provide suggested multimedia assets and/or suggested associations for web-based email applications.

Figure 2:
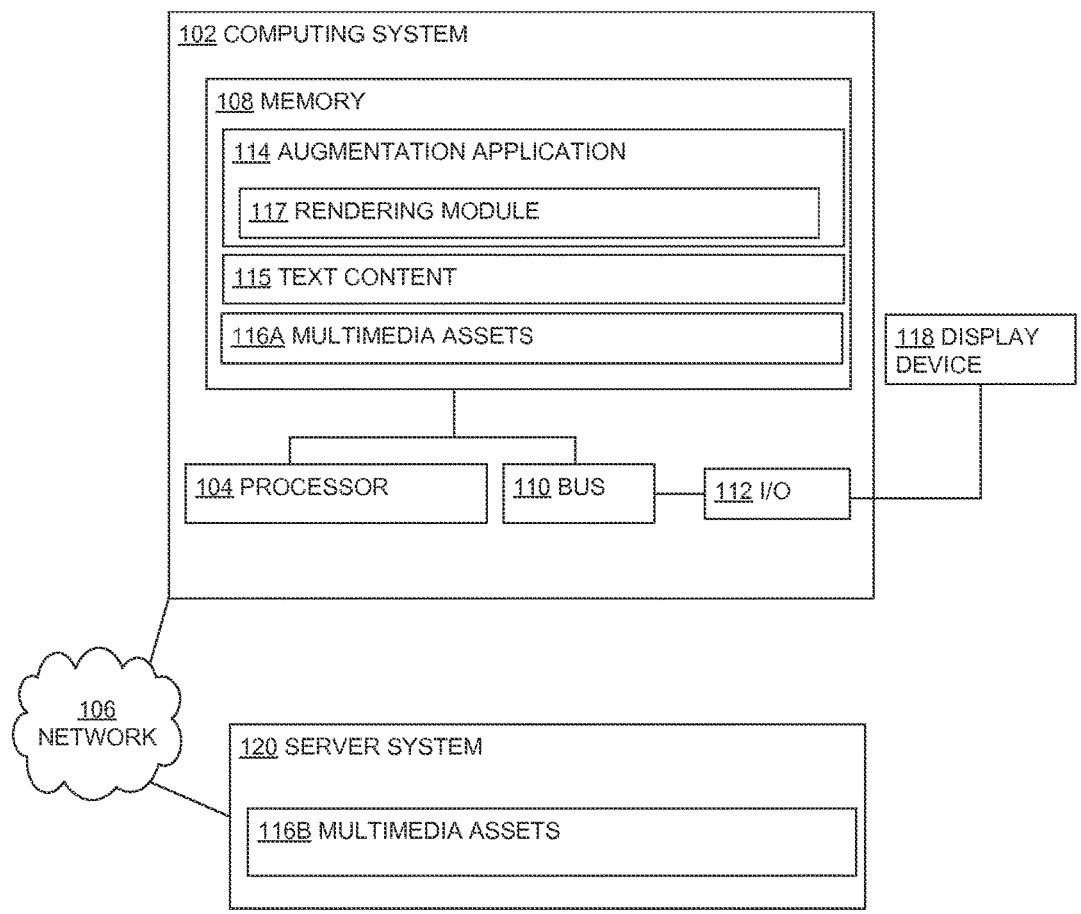
FIG. 2 is a block diagram depicting example computing systems for implementing certain embodiments.

Referring now to the drawings, FIG. 2 is a block diagram depicting an example computing system 102 for implementing certain embodiments.

The computing system 102 includes a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processor. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interfaces 112 and display device 118. A bus 110 can also be included in the computing system 102. The bus 110 can communicatively couple one or more components of the computing system 102.

The computing system 102 can modify, access, or otherwise use text content 115. The text content 115 may be resident in any suitable computer-readable medium and execute on any suitable processor. In one embodiment, the text content 115 can reside in the memory 108 at the computing system 102. In another embodiment, the text content 115 can be accessed by the computing system 102 from a server system 120 via the network 106. The server system 120 can include any suitable computing system for hosting the text content 115. In one embodiment, the server system 120 may be a single computing system. In another embodiment, the server system 120 may be a virtual server implemented using a number of computing systems connected in a grid or cloud computing topology.

The computing system 102 can also modify, access, or otherwise use multimedia assets. Multimedia assets may be resident in any suitable computer-readable medium and execute on any suitable processor. In one embodiment, the multimedia assets 116a can reside in the memory 108 at the computing system 102. In another embodiment, the multimedia assets 116b can be accessed by the computing system 102 from a server system 120 via the network 106.

An augmentation application 114 stored in the memory 108 can configure the processor 104 to augment the text content 115 for display at the display device 118. In some embodiments, the augmentation application 114 can be a software module included in or accessible by a separate application executed by the processor 104 that is configured to modify, access, or otherwise use the text content 115. In other embodiments, the augmentation application 114 can be a stand-alone application executed by the processor 104.

The augmentation application 114 can include a rendering module 117. The rendering module 117 can generate a layout including at least some of the text content 115 and at least some multimedia assets. In some embodiments, the rendering module 117 can render the combined text content and multimedia assets for display at a display device 118. In other embodiments, the rendering module 117 can provide the combined text content and multimedia assets to a separate viewer module or suitable viewer application configured to render the combined text content and multimedia assets for display at a display device 118.

Although FIG. 2 depicts the augmentation application as a single application including a rendering module 117, other embodiments are possible. In other embodiments, the augmentation application 114 can include multiple modules, services, or other software in communication via an application programming interface.

The memory 108 can be any suitable computer-readable medium. A computer-readable medium may comprise, but is not limited to, electronic, optical, magnetic, or other storage device capable of providing a processor with computer-readable instructions. Other examples comprise, but are not limited to, a floppy disk, CD-ROM, DVD, magnetic disk, memory chip, a read-only memory ("ROM"), random-access memory ("RAM"), an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and Action-Script.

The computing system 102 can include any suitable client devices for executing the augmentation application 114. Non-limiting examples of a computing device include a desktop computer, a tablet computer, an e-book reading device, a smart phone, or any other computing device suitable for rendering electronic content. In some embodiments, the display device 118 can be a touch screen device. A touch screen can include any electronic visual display that can detect the presence and location of a touch within a display area defined by the touch screen. A touch can include a detection of an input object, such as a stylus or a finger, that is in contact with or in close proximity to the touch screen.

Figure 3:
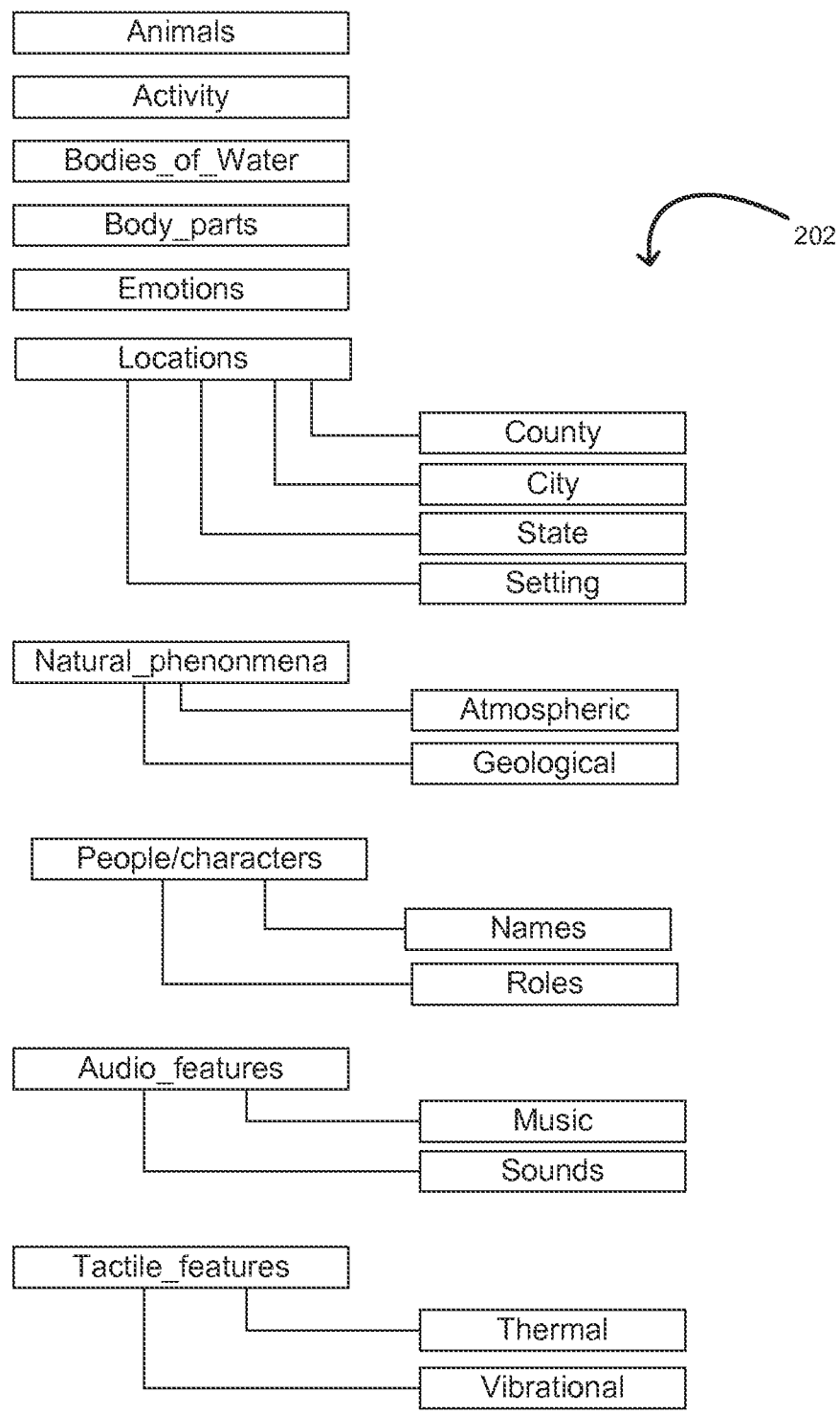
FIG. 3 is a modeling diagram depicting a feature ontology for augmenting text content with multimedia assets.

FIG. 3 is a modeling diagram depicting a feature ontology 202 for augmenting text content 115 with multimedia assets.

The feature ontology 202 can be used to categorize tangible objects. For example, the feature ontology 202 depicted in FIG. 3 includes categories for animals, bodies of water, body parts, and people or characters.

The feature ontology 202 can be also used to categorize intangible states, such as the mood or tone of the events described in the text. For example, the feature ontology 202 depicted in FIG. 3 includes categories for emotions.

The feature ontology 202 can be also used to categorize perceptual properties. For example, the feature ontology 202 depicted in FIG. 3 includes categories for audio features, such as sounds and music, and tactile features, such as thermal changes or vibrations.

The feature ontology 202 can also group words and phrases based on semantic relationships between the words and phrases. In one example, a feature ontology 202 can group words such as "eye," "ear," and "nose" as a class based on their relationship as different sense organs. In another example, a feature ontology 202 can group words such as "disbelief" or "incredulous" as a class based on their relationships as doubtful emotion. A feature ontology 202 can also group proper names such as "Rob" or "Bennie" as a class based on their relationship as different proper names for individuals. A feature ontology 202 can include any number of classes and any type of class.

The augmentation application can associate entities having perceptual properties with multimedia assets. A perceptual property can include an attribute of an entity corresponding to some form of sensory perception. In one example, the augmentation application can select an image of a table entity corresponding to a visual attribute of the table entity (i.e., a description of the table's appearance). In another example, the augmentation application can select an audio file of running water corresponding to an aural attribute of a river entity.

Figure 4:
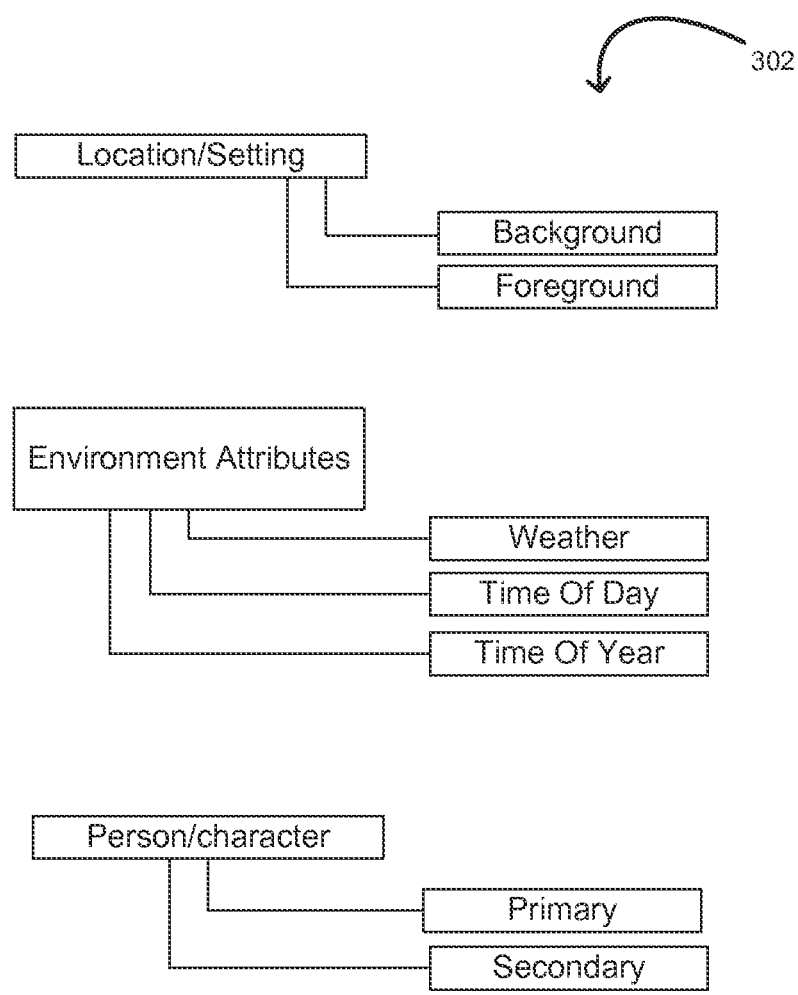
FIG. 4 is a modeling diagram depicting a layout model for organizing entities for augmenting text content with multimedia assets.

The augmentation application 114 can generate a layout model to organize entities into categories that are meaningful to the rendering engine. For example, FIG. 4 is a modeling diagram depicting a layout model 302 for organizing entities for augmenting text content with multimedia assets. The layout model 302 can identify environmental aspects of the setting in which events described in the text occur, such as the weather, season, time of year, time period, etc. The layout model 302 can identify the role of entities in a text. For example, the layout model 302 can classify a character in a novel as a protagonist, an antagonist, a supporting character, etc.

For example, as depicted in FIG. 4, the augmentation application 114 can organize entities based on the categories "Location/Setting," "Environment Attributes," and "Person/Character." The "Location/Setting" category can include the sub-categories "background" and "foreground." The "Environment Attributes" category can include the sub-categories "weather", "time period," and "time of year." The "Person/Character" category can include the sub-categories "primary" and "secondary."

In additional or alternative embodiments, the augmentation application 114 can also generate a priority model to assign priorities to entities based on the context in which the entity is referenced. The rendering engine can access the priority model to select which of multiple entities referenced in a given context are selected for display in a frame.

Figure 5:
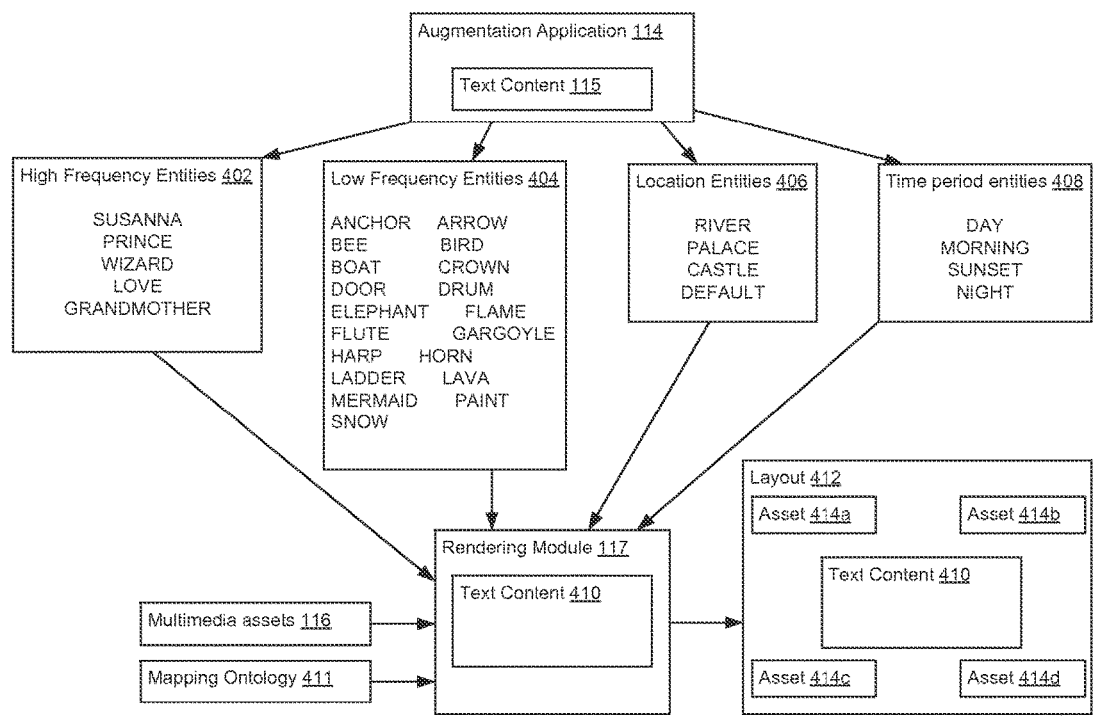
FIG. 5 is a modeling diagram depicting an example algorithm for generating a layout including entities and multimedia assets associated with the entities.

The augmentation application 114 can execute any suitable algorithm for determining which multimedia assets are to be displayed in an interface provided by the augmentation application 114. FIG. 5 is a modeling diagram depicting an example algorithm for generating a layout including entities and multimedia assets associated with the entities.

The augmentation application 114 can execute one or more suitable natural language processing algorithms to identify entities from the text content 115.

The augmentation application 114 can perform pre-processing of words in text. Examples of pre-processing can include stemming, removing irrelevant words, tokenization, and n-gram determination.

Stemming can include converting words and phrases to their root form. For example, stemming can include converting a plural version of a word or phrase ("apples") to a singular version of the word ("apple"), converting a possessive version of a word or phrase ("Denny's") to a non-possessive version of a word or phrase ("Denny"), etc.

Removing irrelevant words can include removing stop words or words without any semantic relationship to other words, such as prepositions or adjectives that are not used to identify a given entity. For example, the word "of" may be relevant in the phrase "Joan of Arc" and irrelevant in the phrase "top of a hill."

Tokenization can include parsing or otherwise splitting text into elements. An element can be a word, such as a proper name, or a phrase, such as a noun coupled with an adjective (e.g., "mad scientist").

The augmentation application 114 can compute or otherwise determine n-grams by executing natural language processing algorithms such as (but not limited to) tokenization, segmentation, n-gram extraction, or part-of-speech tagging. Speech tagging includes determining whether a particular word or phrase includes nouns, verbs, etc. The output of the pre-processing can include a set of unique n-grams identifying entities referenced in the text content 115.

The augmentation application 114 can associate entities with respective multimedia assets by generating a mapping ontology 411. In some embodiments, a multimedia asset can be selected from stored multimedia assets. In other embodiments, the augmentation application 114 can generate a new multimedia asset based on analyzing the content of the document. In one example, the augmentation application 114 may generate a composite image from existing images, such as combining images of a fish or a boat with an image of a river. In one example, the augmentation application 114 may generate a completely new image.

The augmentation application 114 can categorize entities based on any suitable criteria. For example, one class of entities can include high-frequency entities 402. The high-frequency entities 402 can include entities that are uniformly distributed across the text content 115 or referenced in a majority of the text content 115. A non-limiting example of an entity uniformly distributed across the text is a main character in a novel, such as a "Prince" or "Susanna." Another non-limiting example of an entity uniformly distributed across the text includes a theme or emotion, such as "love."

Another class of entities can include low-frequency entities 404. The low-frequency entities 404 are referenced infrequently in the text content 115. A non-limiting example of an entity referenced infrequently in the text content 115 is a character in a novel that appears in only a single chapter of the novel.

In additional or alternative embodiments, the augmentation application 114 can classify entities based on the tangibility (or "ambience") of the entity. For example, a specific person may be classified as being the most tangible. A group of individuals (e.g., "Tom, Dick, and Harry") may be classified as less tangible than the specific person. An organization (e.g., "the U.S. Army") may be classified as less tangible than the group of individuals. An ideology or feeling (e.g., "democracy", "patriotism") may be classified less tangible than organization.

The augmentation application 114 identifies high-frequency entities 402 referenced by the text content 115, such as "SUSANNA", "PRINCE", "WIZARD", "LOVE", "GRANDMOTHER." The augmentation application 114 also identifies low frequency entities referenced by the text content 115, such as "ANCHOR", "ARROW", "BEE", "BIRD", "BOAT", "CROWN", "DOOR", "DRUM", "ELEPHANT", "FLAME", "FLUTE", "GARGOYLE", "HARP", "HORN", "LADDER", "LAVA", "MERMAID", "PAINT", "SNOW." The augmentation application 114 also identifies available frames corresponding to location entities 406 referenced by the text content 115 (such as "RIVER", "PALACE", or "CASTLE", "DEFAULT"). The augmentation application 114 also identifies available time periods referenced by the text content 115, such as "DAY", "MORNING", "SUNSET", "NIGHT."

To generate an interface for a portion of content, such as a page of text content 410 from the text content 115, the rendering module 117 can access the entities identified by the augmentation application 114, the multimedia assets 116, and a mapping ontology 411.

The rendering module 117 determines whether any of the location entities 406 "RIVER", "PALACE", "CASTLE" are referenced in the text content 410. If more than one of the location entities 406 is referenced, the rendering module 117 can access a priority model provided by the augmentation application 114 to determine a priority of each entity. For example, "RIVER" may be selected over "PALACE" and "PALACE" may be selected over "CASTLE". If none of the location entities 406 is referenced, that application can select "DEFAULT."

The rendering module 117 determines whether any of the time period entities 408 are referenced in the text content 410. The rendering module 117 can use a version of a frame corresponding to the selected location entity that includes a placeholder for a time-of-day multimedia asset. The rendering module 117 selects a multimedia asset for the time-of-day most frequently used in the text content 410.

The rendering module 117 determines whether any low-frequency entities are referenced in the text content 410. The rendering module 117 orders any referenced low-frequency entities based on their frequency. The rendering module 117 selects multimedia assets corresponding to the one or more of the most frequently referenced low-frequency entities.

The rendering module 117 determines whether any high-frequency entities are referenced in the text content 410. The rendering module 117 orders any referenced high-frequency entities based on their frequency. The rendering module 117 selects multimedia assets corresponding to the one or more of the most frequently referenced high-frequency entities.

In additional or alternative embodiments, the rendering module 117 can position multimedia assets in a frame based on the classifications of the associated entities in the feature ontology 202. For example, a feature ontology 202 may classify three entities (e.g., Larry, Mac, and Dennis) as characters of a novel and two entities (e.g., tavern, airplane) as settings in the novel. Multimedia assets corresponding to entity settings can be positioned along the bottom of a frame below text content 410. Multimedia assets corresponding to character entities can be positioned along the top of a frame above text content 410.

In additional or alternative embodiments, the rendering module 117 can position multimedia assets in a frame based on relationships between the entities described a feature ontology. For example, the rendering module 117 can determine that a first character is a protagonist and a second character is an antagonist. Images representing the characters can be positioned as facing one another in a frame displaying text of describing actions by the characters.

In some embodiments, the augmentation application can monitor whether a given multimedia asset corresponding to an entity has previously been referenced in the document. The augmentation application can continue displaying the given multimedia asset in a subsequent frame that does not include text that references the entity corresponding to multimedia asset. The retention of the multimedia asset can be based on the entity corresponding to the asset being referenced in a majority of the text displayed in previous frames and/or the frequency with which the entity is referenced in the document. Monitoring whether a given multimedia asset corresponding to an entity has previously been referenced in the document and retaining the multimedia asset can minimize the amount of transition in multimedia assets from frame to frame, thereby allowing the multimedia assets to enhance the text rather than distract from the text.

In additional or alternative embodiments, a decay factor can be associated with an entity. The decay factor can decrease the ranking of an asset based on how recently the asset has been selected for inclusion in a layout.

In additional or alternative embodiments, multimedia assets and/or associations between entities and multimedia assets can be provided by a virtual community of clients. For example, different clients in a virtual community can provide multimedia assets for use in the virtual community. Clients in a virtual community can additionally or alternatively provide suggested associations between multimedia assets and entities. An augmentation application 114 can access the virtual community to obtain multimedia assets to be associated with entities. For example, an online community including fans of a particular novel may allow different clients in the community to provide multimedia assets for association with different characters or settings in the book. An e-book application used for reading the novel can access the virtual community to obtain multimedia assets.

Figure 6:
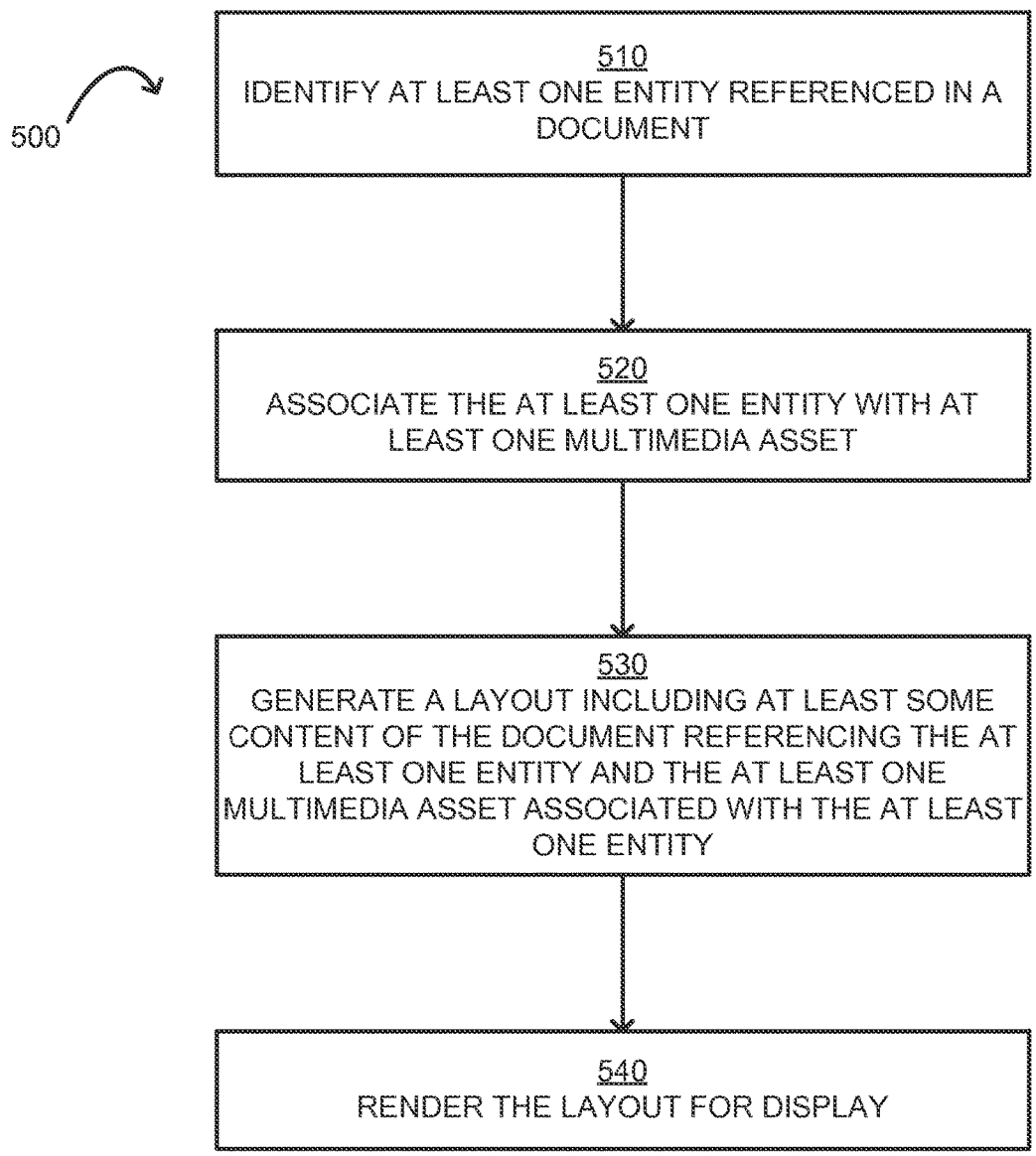
FIG. 6 is a flow chart illustrating an example method for augmenting text with multimedia assets.

FIG. 6 is a flow chart illustrating an example method 500 for augmenting text with multimedia assets. For illustrative purposes, the method 500 is described with reference to the system implementation depicted in FIG. 2. Other implementations, however, are possible.

The method 500 involves identifying at least one entity referenced in a document including text content 115 or any other suitable document, as shown in block 510. The processor 104 of the computing system 102 can execute the augmentation application 114 to identify entities referenced in a document.

The method 500 further involves associating the entity with at least one of the multimedia assets 116, as shown in block 520. The processor 104 of the computing system 102 can execute the augmentation application 114 to associate entities with multimedia assets 116.

The method 500 further involves generating a layout 412 that includes at least some content of the document referencing the entity, such as the text content 410, and the multimedia asset associated with the entity, as shown in block 530. The processor 104 of the computing system 102 can execute the rendering module 117 of the augmentation application 114 to generate a layout 412.

The method 500 further involves rendering the layout 412 for display, as shown in block 540. The processor 104 of the computing system 102 can execute the rendering module 117 to render the layout 412. The layout 412 can be rendered for display at a suitable display device 118.

Figure 7:
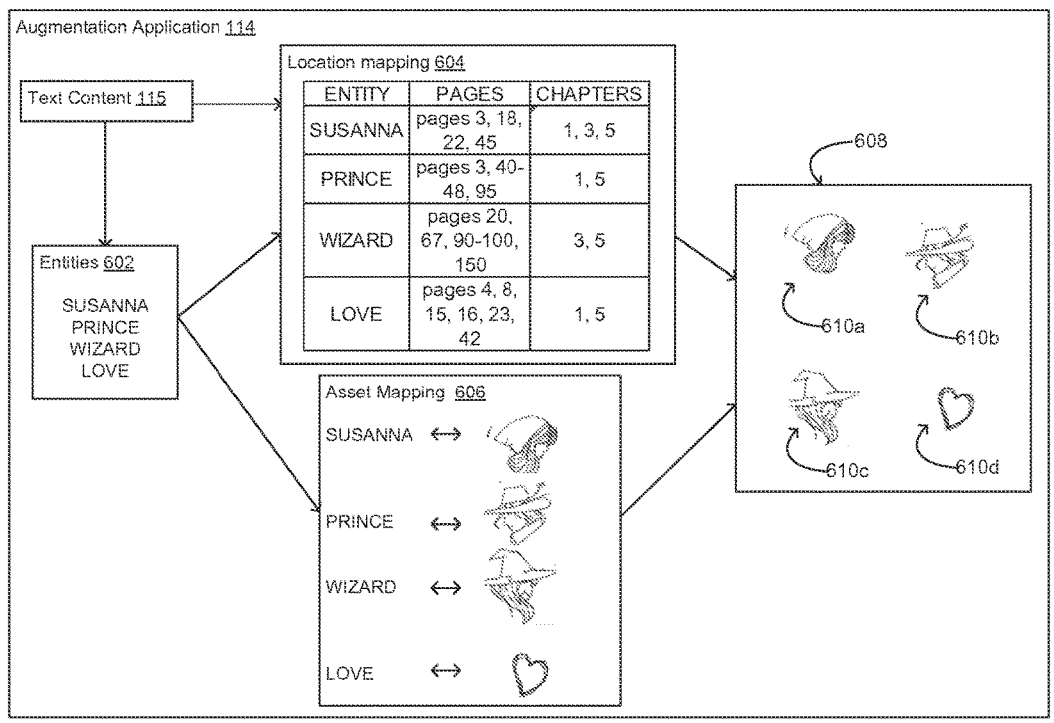
FIG. 7 is a modeling diagram depicting an augmentation application generating a navigation interface from entities referenced in text content and associated multimedia assets.

In additional or alternative embodiments, the augmentation application can generate a navigation interface for organizing a document based on entities associated with multimedia assets. FIG. 7 is a modeling diagram depicting an augmentation application 114 generating a navigation interface 608 from entities 602 referenced in text content 115 and associated multimedia assets.

The augmentation application 114 can identify entities 602 from the text content 115. The augmentation application 114 can identify any number of entities based on any suitable criteria. For example, the augmentation application 114 may limit the number of entities to high-frequency entities, protagonists, significant events in a novel, etc.

The augmentation application 114 can generate a location mapping 604 that maps entities 602 from the text content 115 to the portions of the text content 115 referencing the entities 602. The augmentation application 114 can use any suitable subdivision of the text content 115 for the location mapping 604. For example, as depicted in FIG. 6, entities to be included in a navigation interface are mapped to pages and chapters of a book in which the entities are referenced.

The augmentation application 114 can generate an asset mapping 606 that maps entities 602 to multimedia assets.

The rendering module 117 can generate a navigation interface 608 that includes icons 610a-d generated from multimedia assets associated with the entities 602. The navigation interface 608 can receive input to any of the icons 610a-d representing a command to navigate to the portion of the text content 115 that references an entity represented by the icon. For example, portions of the text content 115 referencing the entity "SUSANNA" can be accessed by selecting the icon 610a. Portions of the text content 115 referencing the entity "PRINCE" can be accessed by selecting the icon 610b. Portions of the text content 115 referencing the entity "WIZARD" can be accessed by selecting the icon 610c. Portions of the text content 115 referencing the entity "LOVE" can be accessed by selecting the icon 610d. The augmentation application 114 can provide the navigation interface 608 to a viewer application, such as an e-book application, for navigating the text content 115.

Figure 8:
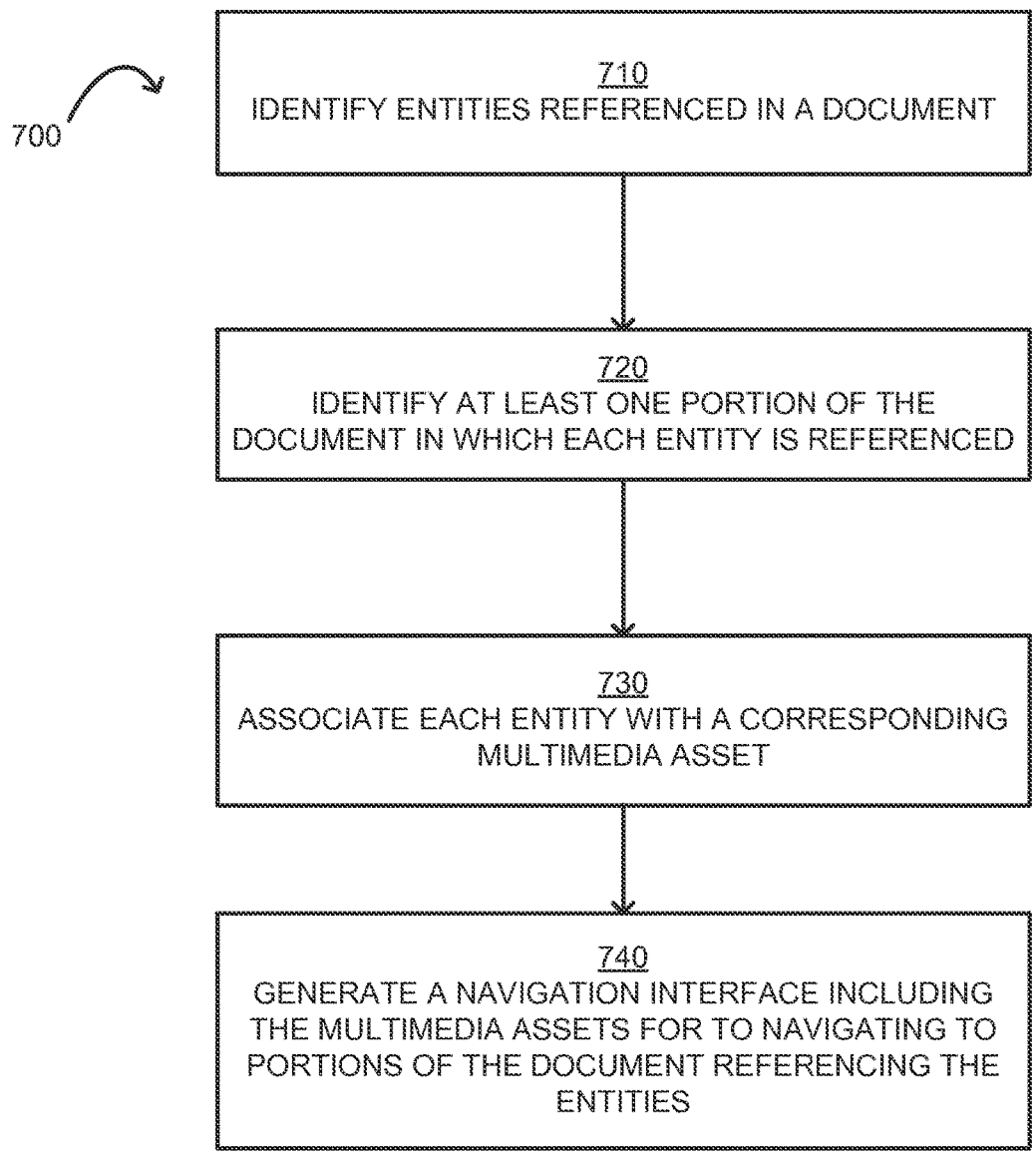
FIG. 8 is a flow chart illustrating an example method for generating a navigation interface by associating entities referenced in text content with multimedia assets.

FIG. 8 is a flow chart illustrating an example method 700 for generating a navigation interface by associating entities referenced in text content with multimedia assets. For illustrative purposes, the method 700 is described with reference to the system implementation depicted in FIG. 2. Other implementations, however, are possible.

The method 700 involves identifying multiple entities referenced in a document including text content 115 or any other suitable document, as shown in block 710. The processor 104 of the computing system 102 can execute the augmentation application 114 to identify entities referenced in a document.

The method 700 further involves identifying at least one portion of the document in each of the entities is referenced, as shown in block 720. The processor 104 of the computing system 102 can execute the augmentation application 114 to identify portions of the document in which each entity is referenced.

The method 700 further involves associating each entity with a corresponding multimedia asset, as shown in block 730. The processor 104 of the computing system 102 can execute the augmentation application 114 to associate entities with corresponding multimedia assets.

The method 700 further involves generating a navigation interface 608 that includes the multimedia assets, as shown in block 740. The processor 104 of the computing system 102 can execute the rendering module 117 to generate the navigation interface 608. The navigation interface 608 can be rendered for display at a suitable display device 118.

Figure 9:
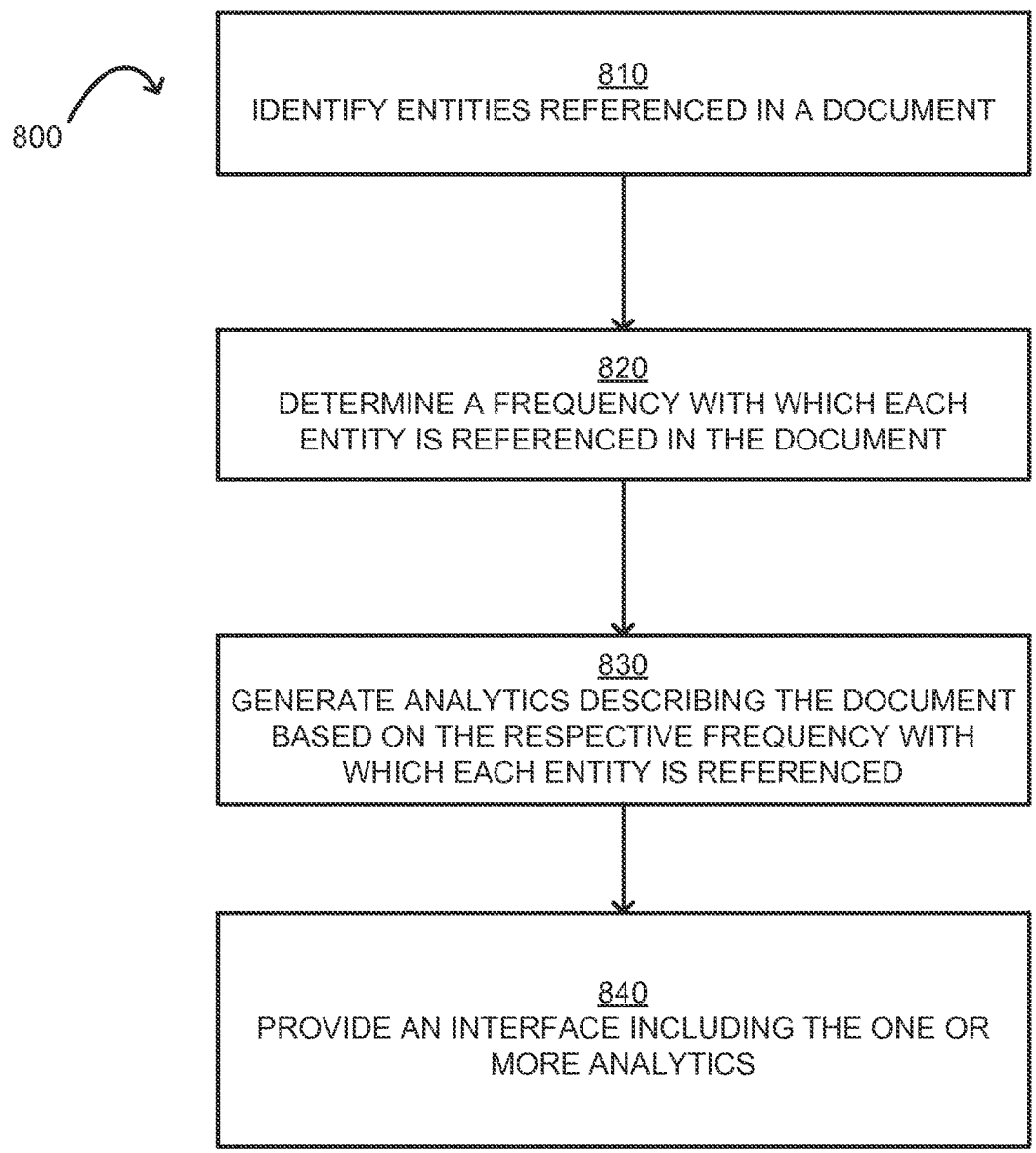
FIG. 9 is a flow chart illustrating an example method 800 for performing analytics on text content using a feature ontology.

In additional or alternative embodiments, the augmentation application can perform analytics on text content using a feature ontology. FIG. 9 is a flow chart illustrating an example method 800 for performing analytics on text content using a feature ontology. For illustrative purposes, the method 800 is described with reference to the system implementation depicted in FIG. 2. Other implementations, however, are possible.

The method 800 involves identifying entities referenced in a document including text content 115 or any other suitable document, as shown in block 810. The processor 104 of the computing system 102 can execute the augmentation application 114 to identify entities referenced in a document.

The method 800 further involves identifying the frequency with which each entity is referenced, as shown in block 820. The processor 104 of the computing system 102 can execute the augmentation application 114 to identify the frequencies which different entities are referenced. For example, the augmentation application can determine the frequency with which entities corresponding to perceptual properties, such as descriptions of colors, are referenced in a document.

The method 800 further involves generating analytics describing the document, as shown in block 830. The analytics can be determined based on the respective frequency with which each entity is referenced in a document or a portion of the document, such as text content 115. The processor 104 of the computing system 102 can execute the rendering module 117 of the augmentation application 114 to generate the analytics. The analytics can include, for example, the relative frequencies with which different entities are referenced, the frequencies with which entities corresponding to perceptual properties are referenced, etc. The analytics can thus provide information regarding the style of writing for the text content 115.

The method 800 further involves providing an interface including the analytics, as shown in block 840. The processor 104 of the computing system 102 can execute the rendering module 117 to generate the interface. The interface can be rendered for display at a suitable display device 118.

In some embodiments, the interface can include feedback for modifying the document based on the analytics. For example, the interface can include feedback recommending words or changes to a writing style to the author based on text analytics. The augmentation application can thereby allow an author of textual content to analyze the author's writing style.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   identifying, by a processor, a first entity referenced in a document, wherein the first entity is identified using a first word or phrase located in a first portion of the document and having a first root word, wherein identifying the first entity comprises:
      identifying an n-gram in the document corresponding to the first entity, wherein identifying the n-gram comprises:
         converting text in the document to a root form of the text by performing at least one of (i) converting a plural form of the text to a singular form of the text or (ii) converting a possessive version of the text to a non-possessive version of the text,
         removing, from the text, at least one of (i) an article or (ii) a preposition,
         splitting the text into token elements, and
         applying, to the text, at least one of segmentation, n-gram extraction, or part-of-speech tagging,
      accessing a feature ontology, wherein the feature ontology comprises a mapping between a plurality of entities identified as n-grams and a plurality of classifications for the entities, wherein the feature ontology includes a character class that maps character entities to corresponding character references in the document, a setting class that maps setting entities to corresponding setting references in the document, and an emotion class that maps emotion entities to corresponding emotion reference in the document, and
      modifying the feature ontology to include the n-gram corresponding to the first entity;
   associating, by the processor, the first entity with a multimedia asset;
   determining, by the processor, that a second word or phrase in a second portion of the document refers to the first entity, wherein the second word or phrase includes a second root word that is different from the first root word in the first word or phrase;

generating, by the processor, a layout for the second portion of the document based on determining that the second word or phrase refers to the first entity, wherein the layout includes the multimedia asset associated with the first entity; and rendering, by the processor, the layout with the second portion of the document for display.

2. The method of claim 1,
wherein the first entity comprises a plurality of entities referenced in the document and the multimedia asset comprises a plurality of multimedia assets;
wherein associating the first entity with the multimedia asset comprises associating each of the plurality of entities with a respective one of the plurality of multimedia assets;
further comprising:
for each of the plurality of entities, identifying, by the processor, a respective portion of the document referencing the first entity; and
generating, by the processor, a navigation interface comprising the multimedia assets associated with the plurality of entities, wherein each of the multimedia assets included in the navigation interface is configured to receive input representing a command to navigate to a respective portion of the document referencing a respective entity associated with the multimedia asset.

3. The method of claim 1, wherein associating the first entity with the multimedia asset comprises:
identifying a virtual community of clients to which the document is accessible;
generating a request to identify the multimedia asset; and
providing the request to a client in the virtual community.

4. The method of claim 1, further comprising:
classifying, by the processor, (i) the first entity based on statistics with respect to a first set of n-grams by which the first entity is referenced in the document and (ii) a second entity based on statistics with respect to a second set of n-grams by which the second entity is referenced in the document; and
assigning, by the processor, a first rank to the first entity and a second rank to the second entity based on the classification.

5. The method of claim 1, further comprising:
classifying, by the processor, the first entity as a tangible object;
based on classifying the first entity as the tangible object, positioning, by the processor, the multimedia asset associated with the first entity at a first position in the layout;
classifying, by the processor, an additional entity referenced in the document as an intangible state comprising at least one of a mood, a tone, or an emotion, wherein the additional entity is identified using an additional word or phrase in the document that is different from the first word or phrase or the second word or phrase; and
based on classifying the additional entity as the intangible state, positioning, by the processor, the multimedia asset associated with the additional entity at a second position in the layout.

6. The method of claim 1,
wherein the first entity comprises a plurality of entities referenced in the document and the multimedia asset comprises a plurality of multimedia assets;
wherein associating the first entity with the multimedia asset comprises associating each of the plurality of entities with a respective one of the plurality of multimedia assets;
further comprising:
determining a frequency with which the first entity is referenced in the document;
based on the frequency, generating analytics describing the document and providing an interface including the analytics.

7. The method of claim 1, wherein identifying the first entity comprises:
performing natural language processing on a plurality of words in the document; and
based on performing the natural language processing, identifying an intangible entity characterized or described by the plurality of words, the intangible entity comprising at least one of a mood, a tone, or an emotion.

8. The method of claim 1, wherein identifying the first entity comprises:
performing natural language processing on a plurality of words in the document, the plurality of words comprising a noun; and
based on performing the natural language processing, identifying a tangible entity characterized or described by the plurality of words.

9. The method of claim 1, wherein the document comprises an electronic book and wherein the layout is rendered for display by an electronic book reader application.

10. A non-transitory computer-readable medium embodying program code executable by a processing device, the non-transitory computer-readable medium comprising:
program code for identifying a first entity referenced in a document, wherein the first entity is identified using a first word or phrase located in a first portion of the document and having a first root word, wherein identifying the first entity comprises:
identifying an n-gram in the document corresponding to the first entity, wherein identifying the n-gram comprises:
converting text in the document to a root form of the text by performing at least one of (i) converting a plural form of the text to a singular form of the text or (ii) converting a possessive version of the text to a non-possessive version of the text,
removing, from the text, at least one of (i) an article or (ii) a preposition,
splitting the text into token elements, and
applying, to the text, at least one of segmentation, n-gram extraction, or part-of-speech tagging,
accessing a feature ontology, wherein the feature ontology comprises a mapping between a plurality of entities identified as n-grams and a plurality of classifications for the entities, wherein the feature ontology includes a character class that maps character entities to corresponding character references in the document, a setting class that maps setting entities to corresponding setting references in the document, and an emotion class that maps emotion entities to corresponding emotion reference in the document, and
modifying the feature ontology to include the n-gram corresponding to the first entity;
program code for associating the first entity with a multimedia asset;

program code for determining that a second word or phrase in a second portion of the document refers to the first entity, wherein the second word or phrase includes a second root word—that is different from the first root word in the first word or phrase;

program code for generating a layout for the second portion of the document based on determining that the second word or phrase refers to the first entity, wherein the layout includes the multimedia asset associated with the first entity; and program code for rendering the layout with the second portion for display.

11. The non-transitory computer-readable medium of claim 10,
wherein the first entity comprises a plurality of entities referenced in the document and the multimedia asset comprises a plurality of multimedia assets;
wherein associating the first entity with the multimedia asset comprises associating each of the plurality of entities with a respective one of the plurality of multimedia assets;
further comprising:
program code for identifying, for each of the plurality of entities, a respective portion of the document referencing the first entity; and
program code for generating a navigation interface comprising the multimedia assets associated with the plurality of entities, wherein each of the multimedia assets included in the navigation interface is configured to receive input representing a command to navigate to a respective portion of the document referencing a respective entity associated with the multimedia asset.

12. The non-transitory computer-readable medium of claim 10, wherein the program code for associating the first entity with the multimedia asset comprises:
program code for identifying a virtual community associated with the document;
program code for generating a request to identify the multimedia asset; and
program code for providing the request to a client in the virtual community.

13. The non-transitory computer-readable medium of claim 10, further comprising:
program code for classifying (i) the first entity based on statistics with respect to a first set of n-grams by which the first entity is referenced in the document and (ii) a second entity based on statistics with respect to a second set of n-grams by which the second entity is referenced in the document; and
program code for assigning a first rank to the first entity and a second rank to the first entity based on the classification.

14. The non-transitory computer-readable medium of claim 10, further comprising:
program code for classifying the first entity as a tangible object or an intangible state; and
program code for performing at least one of:
based on classifying the first entity as the tangible object, positioning the multimedia asset associated with the first entity at a first position in the layout, or
based on classifying the first entity as the intangible state, positioning the multimedia asset associated with the first entity at a second position in the layout.

15. The non-transitory computer-readable medium of claim 10,
wherein the first entity comprises a plurality of entities referenced in the document and the multimedia asset comprises a plurality of multimedia assets;
wherein associating the first entity with the multimedia asset comprises associating each of the plurality of entities with a respective one of the plurality of multimedia assets;
further comprising:
program code for determining a frequency with which the first entity is referenced in the document;
program code for based on the frequency, generating analytics describing the document and
program code for providing an interface including the analytics.

16. A system comprising:
a processor configured to execute instructions stored in a non-transitory computer-readable medium;
wherein the instructions comprise an augmentation application configured to perform operations comprising:
identifying a first entity referenced in a document, wherein the processor is configured for identifying the first entity using a first word or phrase located in a first portion of the document and having a first root word, wherein identifying the first entity comprises:
identifying an n-gram in the document corresponding to the first entity, wherein identifying the n-gram comprises:
converting text in the document to a root form of the text by performing at least one of (i) converting a plural form of the text to a singular form of the text or (ii) converting a possessive version of the text to a non-possessive version of the text,
removing, from the text, at least one of (i) an article or (ii) a preposition,
splitting the text into token elements, and
applying, to the text, at least one of segmentation, n-gram extraction, or part-of-speech tagging;
accessing a feature ontology, wherein the feature ontology comprises a mapping between a plurality of entities identified as n-grams and a plurality of classifications for the entities, wherein the feature ontology includes a character class that maps character entities to corresponding character references in the document, a setting class that maps setting entities to corresponding setting references in the document, and an emotion class that maps emotion entities to corresponding emotion reference in the document; and
modifying the feature ontology to include the n-gram corresponding to the first entity;
associating the first entity with a multimedia asset;
determining that a second word or phrase in a second portion of the document refers to the first entity, wherein the second word or phrase includes a second root word that is different from the first root word in the first word or phrase;
generating a layout for the second portion of the document based on determining that the second word or phrase refers to the first entity, wherein the layout includes the multimedia asset associated with the first entity; and
rendering the layout with the second portion of the document for display.

17. The method of claim 1, further comprising:
identifying, by a processor, an additional entity referenced in a document, wherein the additional entity is identified using an additional word or phrase located in an additional portion of the document and having an additional root word;
associating, by the processor, the additional entity with an additional multimedia asset, wherein associating the additional entity with the multimedia asset comprises:
identifying, based on a description of the additional entity in the document, a perceptual property, the perceptual property comprising an attribute of the additional entity associated with a sensory perception,
determining that a presentation of the additional multimedia asset provides the sensory perception, and
modifying, based on the additional multimedia asset providing the sensory perception, a mapping ontology to include a mapping between the additional entity and the additional multimedia asset, wherein the mapping ontology maps entities with respective multimedia assets; and
including the additional multimedia asset in the layout based on (i) the presentation of the additional multimedia asset providing the sensory perception and (ii) the additional entity being referenced in the second portion of the document.

18. The method of claim 1, further comprising:
identifying, by the processor, a second entity referenced in the document and a third entity referenced in the document;
determining, by the processor, that an additional portion of the document includes text referring to the second entity and the third entity;
selecting, by the processor, a multimedia asset associated with the third entity rather than a multimedia asset associated with the second entity, wherein the multimedia asset associated with the third entity is selected based on determining that the multimedia asset associated with the second entity has been selected for a previous layout more recently than the multimedia asset associated with the third entity;
generating, by the processor, an additional layout for the additional portion of the document referring to the third entity, wherein the layout includes the selected multimedia asset associated with the third entity; and
rendering, by the processor, the additional layout with the additional portion of the document for display.

* * * * *

UNITED STATES PATENT AND TRADEMARK OFFICE
CERTIFICATE OF CORRECTION

| | |
|---|---|
| PATENT NO. | : 9,940,307 B2 |
| APPLICATION NO. | : 13/731445 |
| DATED | : April 10, 2018 |
| INVENTOR(S) | : Emre Demiralp et al. |

It is certified that error appears in the above-identified patent and that said Letters Patent is hereby corrected as shown below:

On the Title Page

"(72) Inventors:" fourth inventor:
Delete "Daicho Ito"
Insert --Daichi Ito--

Signed and Sealed this
Twentieth Day of August, 2024

Katherine Kelly Vidal
*Director of the United States Patent and Trademark Office*